(12) United States Patent
Kulas

(10) Patent No.: US 7,156,136 B1
(45) Date of Patent: Jan. 2, 2007

(54) CHUTE RIM DEVICE

(76) Inventor: Tim Kulas, 300 S. Shuman St., Verona, WI (US) 53593

( * ) Notice: Subject to any disclaimer, the term of this patent is extended or adjusted under 35 U.S.C. 154(b) by 0 days.

(21) Appl. No.: 11/347,353

(22) Filed: Feb. 3, 2006

(51) Int. Cl.
*B65B 1/04* (2006.01)

(52) U.S. Cl. ............... 141/331; 141/340; 141/364; 366/347

(58) Field of Classification Search ........ 141/331, 141/340, 341, 347, 364, 365, 366, 391; 220/571.1; 222/570; 366/347
See application file for complete search history.

(56) References Cited

U.S. PATENT DOCUMENTS

| | | | | |
|---|---|---|---|---|
| 3,169,643 A | * | 2/1965 | Roberts | 141/286 |
| 3,400,867 A | * | 9/1968 | Giannone | 222/570 |
| 4,299,340 A | * | 11/1981 | Hrytzak | 222/189.07 |
| 4,900,160 A | * | 2/1990 | Brooks et al. | 366/347 |

* cited by examiner

*Primary Examiner*—Steven O. Douglas
(74) *Attorney, Agent, or Firm*—Medlen & Carroll, LLP

(57) ABSTRACT

The present invention relates to devices facilitating the addition of items into containers. In particular, the present invention relates to devices configured to assist in supplying food items into mixing containers.

8 Claims, 3 Drawing Sheets

CHUTE RIM DEVICE

FIELD OF THE INVENTION

The present invention relates to devices facilitating the addition of items into containers. In particular, the present invention relates to devices configured to assist in supplying food items into mixing containers.

BACKGROUND

Food preparation often involves the simultaneous use of many different food preparation tools. The simultaneous use of multiple food preparation tools renders the supplying of different ingredients rather difficult and cumbersome. For example, mixing bowls are often used with mechanical mixing tools such as the Kitchen Aid Mixer. Mixing tools, however, are large and bulky, and render the supplemental addition of food into the mixing bowl nearly impossible. What is needed are improved devices that permit the supplying of food into mixing bowls occupied with bulky cooking tools.

SUMMARY OF THE INVENTION

The present invention relates to devices facilitating the addition of items into containers. In particular, the present invention relates to devices configured to assist in supplying food items into mixing containers.

In certain embodiments, the present invention provides a device for adding items to a container, comprising a central body having a central body top end, a central body bottom end, two central body side ends, a central body front face, and a central body back face, wherein the shape of the central body is chuted such that addition of the item at the central body top end will descend along the central body front face to the central body bottom end; and an attachment arm positioned at each central body side end, the attachment arms extending behind the central body front face, the attachment arms having an attachment arm top end and an attachment arm bottom end, the attachment arm bottom end having therein an attachment arm slot, the attachment arm slot is configured to receive the rim of the container; wherein receipt of the rim of the container within the attachment arm slots secures the device with the container such that the central body bottom end extends beneath the rim and into the container.

In preferred embodiments, the container is a mixing bowl. In preferred embodiments, the attachment arm slot extends from the attachment arm bottom end at approximately a 45 degree angle. In preferred embodiments, the width of the central body top end is wider than the width of the central body bottom end.

In preferred embodiments, the composition of the device is selected from the group consisting of plastic, stainless steel, non-stick coating, and Teflon.

In preferred embodiments, upon securing of the device with the container, the device extends at approximately a 45 degree angle from the container.

In certain embodiments, the present invention provides a system, comprising a rimmed container and the chute rim device. In preferred embodiments, the system further comprises a mechanical mixer.

DETAILED DESCRIPTION

The present invention relates to devices facilitating the addition of items into containers. In particular, the present invention relates to devices configured to assist in supplying food items into mixing containers.

Figure 1:
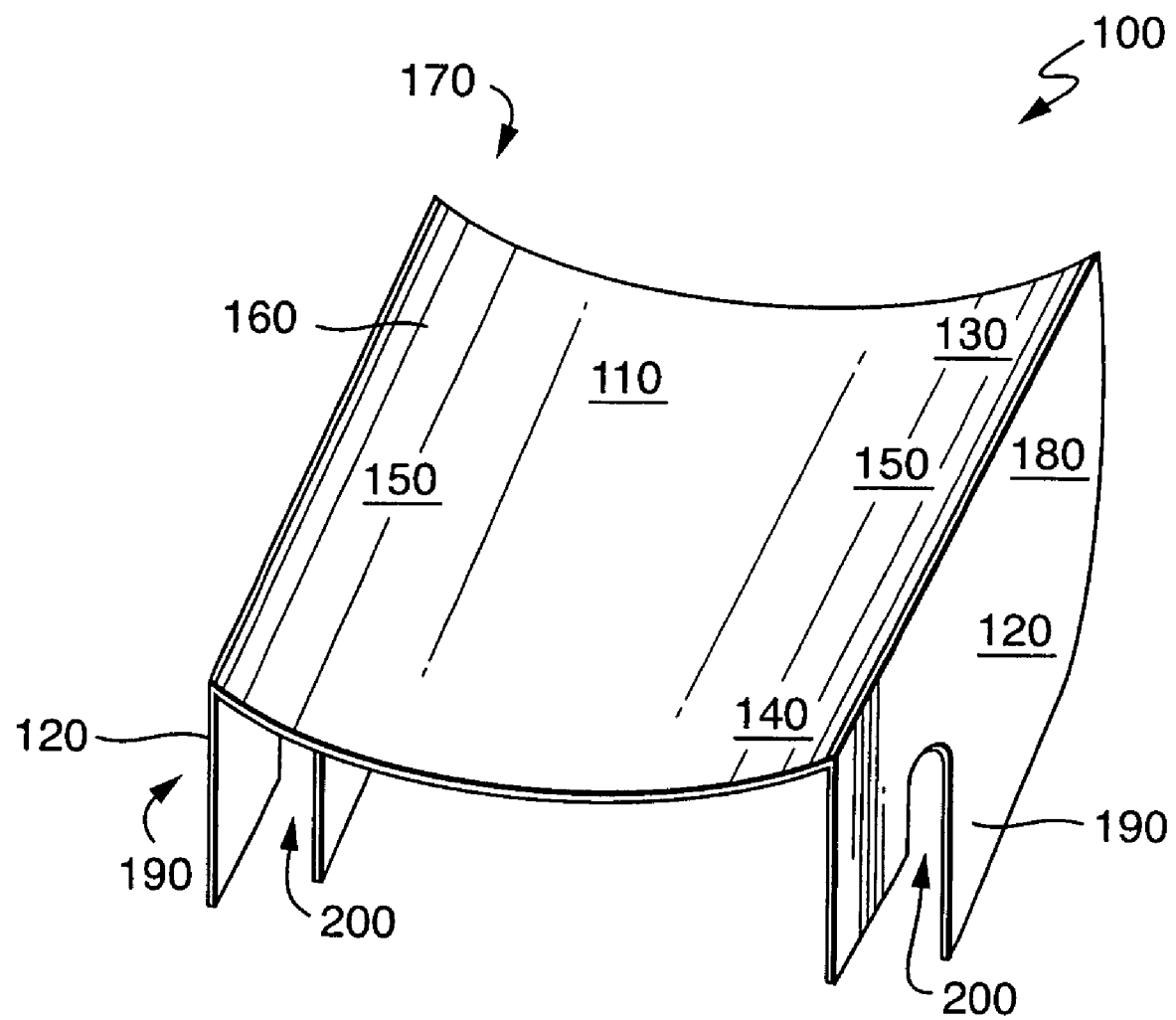
FIG. 1 shows a front corner view of a chute rim device embodiment of the present invention.
Figure 2:
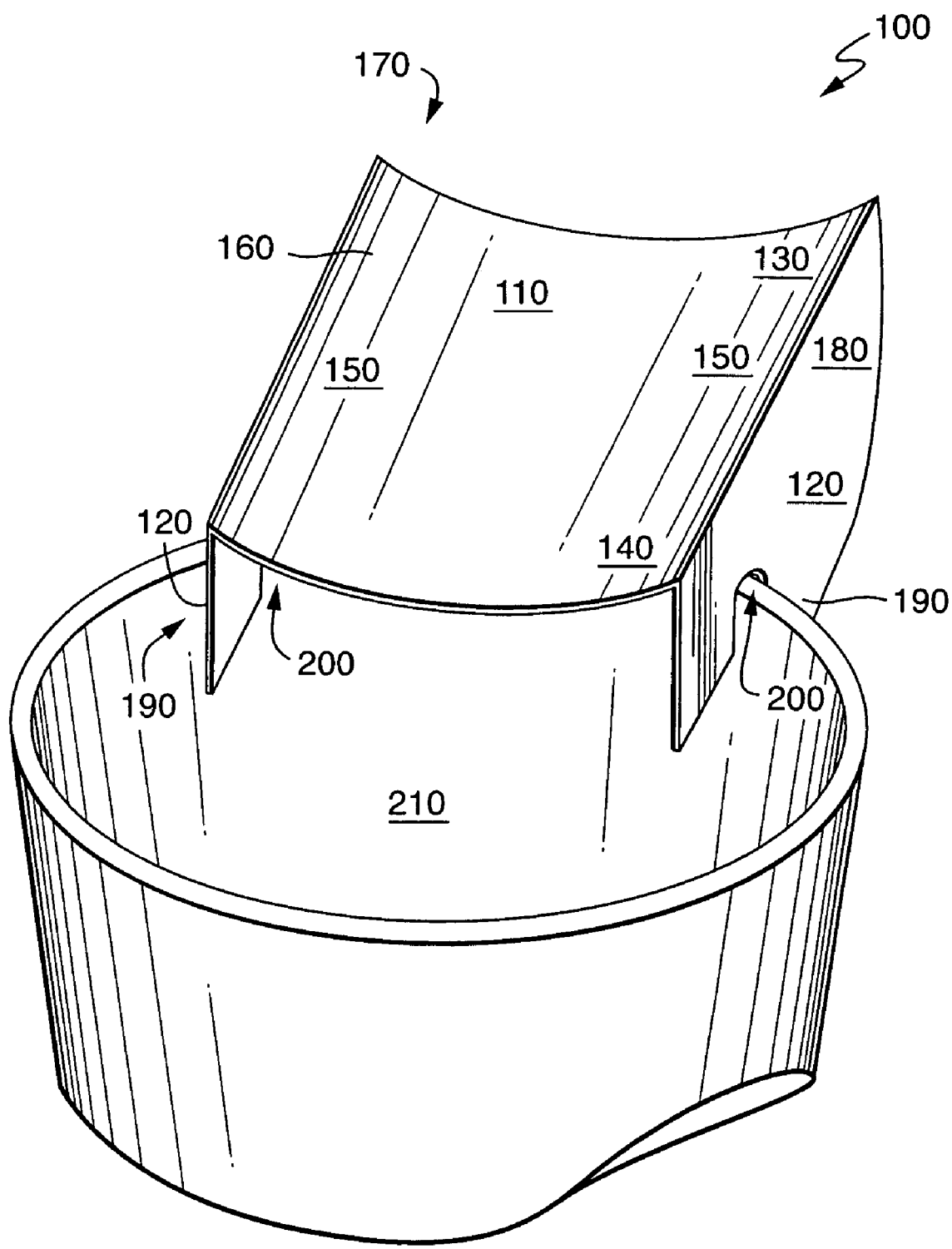
FIG. 2 shows a chute rim device embodiment of the present invention attached with a container.

FIGS. 1–2 illustrate various preferred embodiments of the devices of the present invention. The present invention is not limited to these particular embodiments. The chute rim devices of the present invention are applicable for use as a tool for supplying items (e.g., food items) into a container (e.g., a mixing bowl). In particular, the chute rim device permits the supplying of food into a mixing bowl occupied with a mixing machine (e.g., a Kitchen Aid Mixer). The chute rim device of the present invention has numerous advantages over previous prior art devices including, but not limited to, smaller size, easier storage, easier cleaning, and easier ability to cook. The present invention is not limited to any particular mechanism. Indeed, an understanding of the mechanism is not necessary to practice the present invention. Nevertheless, it is contemplated that the chute rim device functions on the principle that addition of items into a container is rendered easier with a trough that extends above and beyond the rim of a container and into the container (described in more detail below).

FIG. 1 shows a front corner view of one embodiment of a chute rim device of the present invention. Referring to FIG. 1, in some embodiments, a chute rim device 100 generally comprises a central body 110 and attachment arms 120. The chute rim device 100 is not limited to a particular material composition (e.g., steel, iron, aluminum, plastic, non-stick coating, enamel, paint, rubber, stainless steel, or mixture thereof). In preferred embodiments, the material composition of the chute rim device 100 is stainless steel. The chute rim device 100 is not limited to a particular size. In preferred embodiments, the chute rim device 100 is configured for attachment onto the rim of a container (e.g., mixing bowl) (described in more detail below). In preferred embodiments, upon attachment of the chute rim device 100 onto the rim of a container, items (e.g., food items) may be added into the container through the chute rim device 100 (described in more detail below).

Still referring to FIG. 1, the central body 110 comprises a central body top end 130, a central body bottom end 140, central body sides 150, a central body front face 160, and a central body back face 170. The central body 110 is not limited to a particular thickness. In preferred embodiments, the thickness of the central body 110 is less than 5 mm. The central body 110 is not limited to a particular shape. In some embodiments, the shape of the central body 110 is flat. In preferred embodiments, the shape of the central body 110 is chuted (e.g., concave, funneled). In preferred embodiments, upon addition of the chute rim device 100 onto the rim of a container, a chute shaped central body 110 creates a curved descending path (described in more detail below).

Still referring to FIG. 1, the central body top end 130 is not limited to a particular length. In preferred embodiments, the length of the central body top end 130 is approximately 6 inches. The central body bottom end 140 is not limited to a particular length. In preferred embodiments, the length of the central body bottom end 140 is approximately 4 inches. In preferred embodiments, upon addition of the chute rim device 100 onto the rim of a container, the central body bottom end 140 is positioned beneath the rim and inside of the container (described in more detail below).

Still referring to FIG. 1, the attachment arms 120 are positioned along the central body sides 150. In some embodiments, the attachment arms 120 are attached (e.g., welded, glued, etc.) onto the respective central body sides 150. In preferred embodiments, the attachment arms 120 are bent from the central body 110. In preferred embodiments, the attachment arms 120 extend behind the central body 110. The attachment arms 120 are not limited to a particular shape (e.g., circular, oval, rectangular, triangular, square, or partial aspect thereof). In preferred embodiments, the shape of the attachment arms 120 is partially oval. The attachment arms 120 are not limited to a particular manner of extension behind the central body 110. In preferred embodiments, the attachment arms 120 extend from the central body 110 in a perpendicular manner. In preferred embodiments, the attachment arms 120 are used to secure the chute rim device 100 onto the rim of a container (described in more detail below).

Still referring to FIG. 1, the attachment arms 120 have an attachment arm top end 180, and an attachment arm bottom end 190. The attachment arm top end 180 is not limited to a particular length. In preferred embodiments, the length of the attachment arm top end 180 is at least 1 mm. The attachment arm bottom end 190 is not limited to a particular length. In preferred embodiments, the length of the attachment arm bottom end 190 is at least 1 cm. In particularly preferred embodiments, the length of the attachment arm bottom end 190 is 1 inch.

Still referring to FIG. 1, in preferred embodiments, the attachment arm bottom end 190 has therein an attachment arm slot 200. The attachment arm slot 200 is not limited to particular size dimensions. In preferred embodiments, the size of the attachment arm slot 200 is such that it can receive and secure the rim of a container (e.g., at least 0.1 mm in width and at least 1 mm in length). The attachment arm slot 200 is not limited to a particular positioning along the attachment arm bottom end 190. In preferred embodiments, the attachment arm slot 200 is positioned at the approximate center point of the attachment arm bottom end 190. In preferred embodiments, the attachment arm slot 200 extends through the attachment arm 120. The attachment arm slot 200 is not limited to a particular manner of extension through the attachment arm 120. In preferred embodiments, the attachment arm slot 200 extends toward the central body 110 at approximately a 45 degree angle. The attachment arm slot 200 is not limited to a particular distance of extension through the attachment arm 120. In preferred embodiments, the attachment arm slot 200 extends through the attachment arm 120 at least 0.5 mm. In preferred embodiments, the attachment arm slots 200 are configured to receive the rim of a container in a manner securing the chute rim device 100 onto the container (described in more detail below).

FIG. 2 shows a chute rim device 100 embodiment of the present invention attached with a container 210. As shown, the chute rim device 100 has a central body 110 with a central body top end 130, a central body bottom end 140, central body sides 150, a central body front face 160 and a central body back face 170. As shown, the chute rim device 100 has attachment arms 120 positioned along the central body sides 150, each having an attachment arm top end 180, and an attachment arm bottom end 190 having therein an attachment arm slot 200. As shown, the central body bottom end 140 extends beneath the rim of and inside the container 210. Additionally, as shown, the central body top end 130 extends above and beyond the rim of the container 210. As shown, the central body 110 extends above and beyond the rim of the container 210 at approximately a 45 degree angle, thereby providing a descending trough from the outside to the inside of the container 210.

Still referring to FIG. 2, the attachment arm slots 200 have received the rims of the container 210 in a manner securing the chute device 100 with the container 210. In particular, as the rim of a container 210 is received by the attachment arm slots 200, a securing force is applied onto the container by the attachment arm bottom end 190. In preferred embodiments, the securing force applied onto the container 210 by the attachment arm bottom end 190 is strong enough to prevent the chute rim device 100 from use related rattling or loosening.

Figure 3:
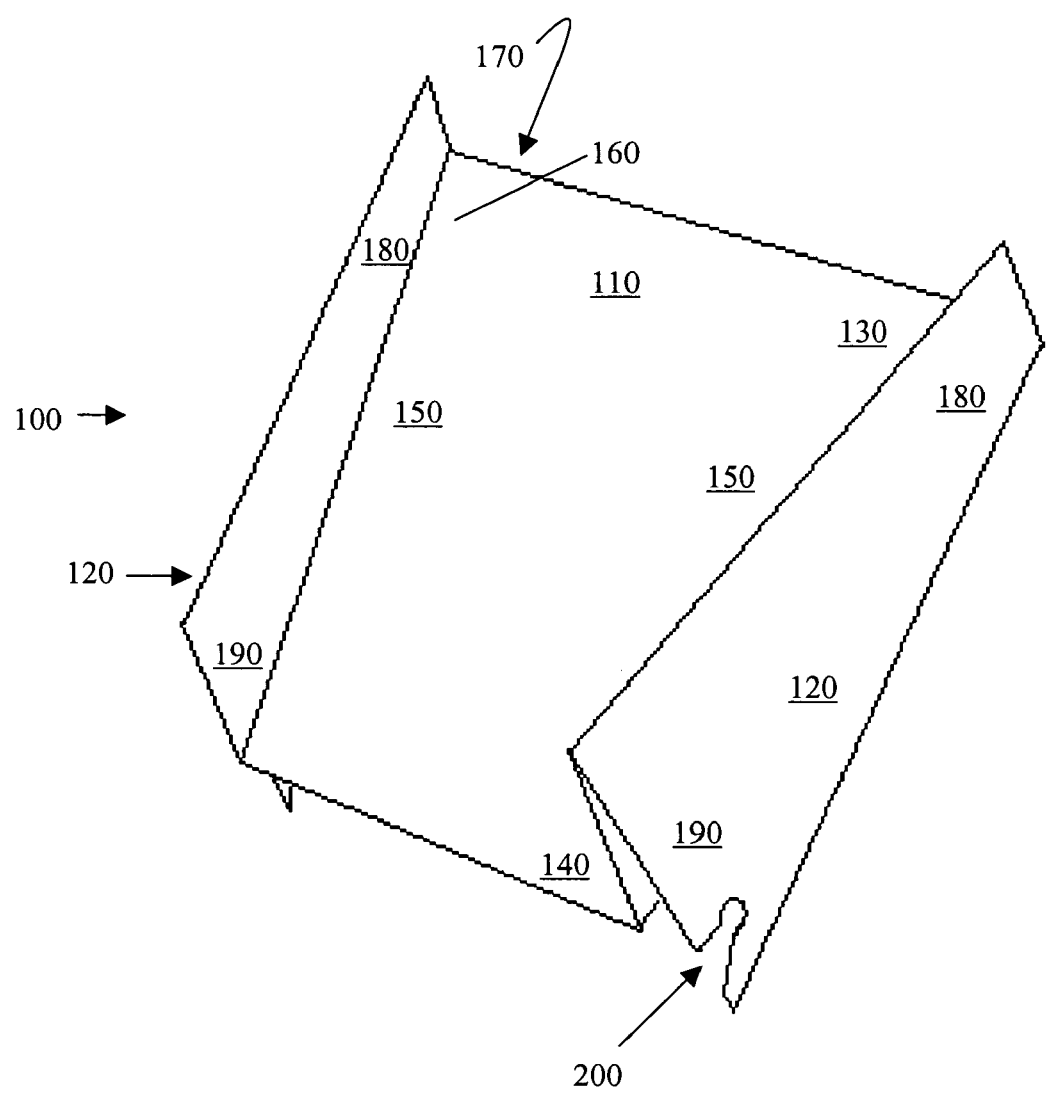
FIG. 3 shows a chute rim embodiment of the present invention.

FIG. 3 shows a chute rim device 100 embodiment of the present invention attached with a container 210. As shown, the chute rim device 100 has a central body 110 with a central body top end 130, a central body bottom end 140, central body sides 150, a central body front face 160 and a central body back face 170. As shown, the chute rim device 100 has attachment arms 120 positioned along the central body sides 150, each having an attachment arm top end 180, and an attachment arm bottom end 190 having therein an attachment arm slot 200. As shown, the central body front face 160 and the central body arms 120 are approximately flat (e.g., not curved). The central body arms 120 are not limited to a particular positioning in relation to the central body front face 160. As shown in FIGS. 1 and 2, the central body arms 120 extend downward in relation to the central body front face 160. As shown in FIG. 3, the central body arms 120 extend upward and fold downward (e.g., in the shape of a triangle). As such, as shown in FIG. 3, the central body arms 120 provide a border thereby preventing items (e.g., food items) positioned on the central body front face 160 from falling off the central body sides 150. In addition, the central body arms 120 shown in FIG. 3 assure that items (e.g., food items) positioned on the central body face 160 travel from the central body top end 130 to the central body bottom end 140. In preferred embodiments, the central body arms 120 are positioned in an approximately perpendicular manner to the central body front face 160. In preferred embodiments, the central body arms 120 are positioned at an approximately acute angle in relation to the central body front face 160. In preferred embodiments, the central body arms 120 are positioned at an approximately obtuse angle in relation to the central body front face 160. In preferred embodiments, the angle of the central body arms 120 gradually changes from the central body top end 130 to the central body front face bottom end 140 (e.g., gradually increases in degree of angle; gradually decreases in degree of angle).

The chute rim devices of the present invention are not limited to particular uses. In preferred embodiments, the chute rim devices of the present invention find use within food preparation settings (e.g., kitchen settings). In preferred embodiments, the chute rim devices of the present invention find use for the addition of food items into a mixing bowl occupied with a mechanical mixer (e.g., KitchenAid Mixer). Indeed, a problem that exists within food preparation settings is the difficulty in adding food to a mixing bowl occupied with a mixer (e.g., the size of the mixer complicates the addition of food into the mixing bowl). The chute rim device provides an easy solution for adding food into a mixing bowl occupied with a mixer by proving an angled trough from above and outside the mixing bowl to beneath the rim and within the mixing bowl. Any kind of food may be used with the chute rim devices of the present invention, including, but limited to solid foods, liquid foods, and mixtures thereof.

The chute rim devices of the present invention provide an improvement over prior art devices such as U.S. Pat. No. 4,900,160. In particular, U.S. Pat. No. 4,900,160, requires the attachment with the entire rim of a container (e.g., mixing bowl). The chute rim devices of the present invention, however, only require attachment with a part of the rim of a container, and as such, are easier to use than the devices of U.S. Pat. No. 4,900,160, and requires less storage space.

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

I claim:

1. A device for adding items to a container, comprising:
    a central body having a central body top end, a central body bottom end, two central body side ends, a central body front face, and a central body back face, wherein the shape of said central body is chuted and inwardly tapered from said central body top end to said central body bottom end, such that addition of said item at said central body top end will descend along said central body front face to said central body bottom end;
    an attachment arm positioned at each central body side end, said attachment arms extending behind said central body front face, said attachment arms having an attachment arm top end and an attachment arm bottom end, said attachment arm bottom end having therein an attachment arm slot, said attachment arm slot is configured to receive the rim of said container; wherein receipt of said rim of said container within said attachment arm slots secures said device with said container such that said central body bottom end extends beneath said rim and into said container.

2. The device of claim 1, wherein said container is a mixing bowl.

3. The device of claim 1, wherein said attachment arm slot extends from said attachment arm bottom end at approximately a 45 degree angle.

4. The device of claim 1, wherein the width of said central body top end is wider than the width of said central body bottom end.

5. The device of claim 1, wherein the composition of said device is selected from the group consisting of plastic, stainless steel, non-stick coating and Teflon.

6. The device of claim 1, wherein upon securing of said device with said container, said device extends at approximately a 45 degree angle from said container.

7. A system, comprising a rimmed container and the device of claim 1.

8. The system of claim 7, wherein said rimmed container is adapted for use with a a mechanical mixer.

* * * * *